(12) United States Patent
Basak

(10) Patent No.: US 9,465,240 B2
(45) Date of Patent: Oct. 11, 2016

(54) OPTICAL ABSORPTION BASED DEVICE

(71) Applicant: INTEL CORPORATION, Santa Clara, CA (US)

(72) Inventor: Juthika Basak, San Jose, CA (US)

(73) Assignee: Intel Corporation, Santa Clara, CA (US)

(\*) Notice: Subject to any disclaimer, the term of this patent is extended or adjusted under 35 U.S.C. 154(b) by 192 days.

(21) Appl. No.: 14/305,817

(22) Filed: Jun. 16, 2014

(65) Prior Publication Data
US 2015/0365169 A1    Dec. 17, 2015

(51) Int. Cl.
*G02B 6/12*    (2006.01)
*G02F 1/025*   (2006.01)
*G02F 1/015*   (2006.01)

(52) U.S. Cl.
CPC ....... *G02F 1/025* (2013.01); *G02F 2001/0156* (2013.01); *G02F 2202/105* (2013.01); *G02F 2202/42* (2013.01)

(58) Field of Classification Search
CPC ............... H01L 2924/00; H01L 2924/00014; H01L 24/00; G02B 6/43; G02B 6/4214; G02B 6/12
USPC ................. 385/14, 15, 129, 130, 131, 132
See application file for complete search history.

(56) References Cited

U.S. PATENT DOCUMENTS

| 6,600,842 B2 * | 7/2003 | Yamada | G02F 1/01708 257/183 |
| 6,862,124 B2 * | 3/2005 | Akiyama | B82Y 20/00 359/237 |

\* cited by examiner

*Primary Examiner* — Jennifer Doan
(74) *Attorney, Agent, or Firm* — Schwabe, Williamson & Wyatt, P.C.

(57) ABSTRACT

Embodiments of the present disclosure are directed toward techniques and configurations for an optical absorption based device using a semiconductor-dielectric-semiconductor structure. In one embodiment, the device may include an optical waveguide to transmit light inputted by a light source. The waveguide may include a first semiconductor layer, a second semiconductor layer disposed above the first semiconductor layer, a dielectric layer disposed between the first and second semiconductor layers, and an absorptive material layer disposed between the dielectric layer and the first or second semiconductor layer. The absorptive material layer may have a variable light absorption coefficient to allow intensity of light to be modulated through modulation of the absorption coefficient. The light may be substantially confined between the first and second semiconductor layers of the waveguide. Other embodiments may be described and/or claimed.

25 Claims, 9 Drawing Sheets

OPTICAL ABSORPTION BASED DEVICE

FIELD

Embodiments of the present disclosure generally relate to the field of optoelectronics, and more particularly, to techniques and configurations for an optical absorption based device using a semiconductor-dielectric-semiconductor structure, used to modulate light through modulation of the absorption coefficient of a material included in the device.

BACKGROUND

Optical interconnects are fast becoming popular for high speed data transmission systems in telecommunications and data center/enterprise networks. Optical modulators used in such systems are configured to modulate the intensity of beams of light used for data transmission. Some optical modulator devices may use light modulation techniques based on changing absorption coefficient of a material (e.g., absorptive material) through which the input light beam travels, thus correspondingly changing the intensity of the light beam. One method of using absorptive materials for optical modulators may entail using a metal-oxide-semiconductor (MOS) structure in a modulator waveguide, where the absorptive material may be sandwiched between the oxide and semiconductor. However, undesired light absorption losses may occur in the MOS-based waveguide due to presence of a metal contact layer adjacent to the waveguide. The modulation efficiency may also be low because of low confinement of light in the waveguide.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
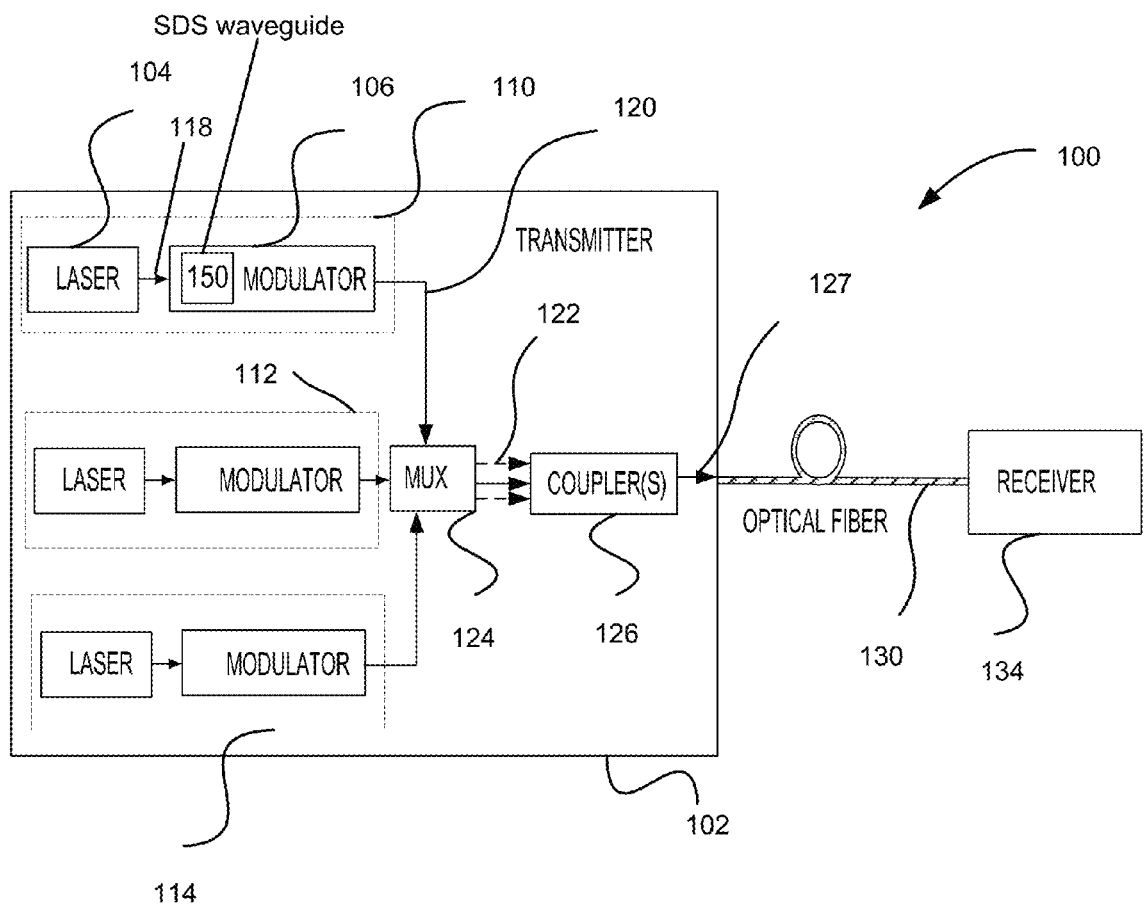
FIG. 1 is a block diagram of an optoelectronic system that may include a modulator configured to modulate light using light absorption modulation techniques described herein, in accordance with some embodiments.

Embodiments of the present disclosure describe techniques and configurations for an optical device configured to provide light modulation with high modulation efficiency and low optical loss within the optical waveguide of the device. In some embodiments, the optical waveguide may include a first semiconductor layer, a second semiconductor layer disposed above the first semiconductor layer, a dielectric layer disposed between the first and second semiconductor layers, and an absorptive material layer disposed between the dielectric layer and the first or second semiconductor layer. The absorptive material layer may have a variable light absorption coefficient to allow intensity of light passing through the layer to be modulated through modulation of its absorption coefficient. The light may be substantially confined between the first and second semiconductor layers of the waveguide, providing for desired modulation efficiency.

The device may further comprise a modulator, with the waveguide including metal contacts (e.g., layers) to allow voltage to be applied to the waveguide to modulate the absorption coefficient of the absorptive material layer. The metal contacts and layers may be disposed away from a center of an optical mode of the waveguide, providing for at least a reduction of the background absorption loss in the metal. At least one of the metal layers may be disposed to be in direct contact with the absorptive material layer, lowering contact resistance and enhancing transmission bandwidth of the modulator.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of an optoelectronic system 100 that may include a modulator configured to modulate light using light absorption modulation techniques described herein, in accordance with some embodiments. The optoelectronic system 100 may be used to transmit an optical signal modulated with a data signal via an optical fiber, for example, between racks in a data center, or long-distance, between data storage facilities, data centers, and the like.

The optoelectronic system 100 may include a transmitter 102 (e.g., photonic chip) having one or more light sources (e.g., laser devices) 104 to provide a light signal 118 (e.g., constant light intensity signal) to a respective modulator 106 to modulate input light according to a data signal to be transmitted, as will be described below in greater detail. Each combination of the light source 104 and corresponding modulator 106 may comprise a communication channel 110, 112, 114. Although three communication channels are shown, fewer or multiple more communication channels may be used in a transmitter such as 102, e.g., to provide a desired data transmission rate. The modulator 106 may output a modulated optical signal 120 to a multiplexer 124, where a signal 122 multiplexed from communication channels 110, 112, and 114 may be input to a coupler (or couplers) 126. Alternatively, the signals from communication channels 110, 112, and 114 may be directly input to multiple couplers such as the coupler 126, without going through the multiplexer 124. The coupler 126 may provide the interface from the multiplexer 124 or the waveguide 150 on the photonic chip to an optical communication channel (e.g., optical fiber cable) 130 and is configured to transfer the combined optical signal 127 to the optical communication channel 130, to be received by a receiver 134. In embodiments, one or more modulators 106 may be incorporated with a semiconductor-dielectric-semiconductor (SDS) based optical waveguide 150 of the present disclosure, to provide enhanced light modulation, to be described more fully below.

Figure 2:
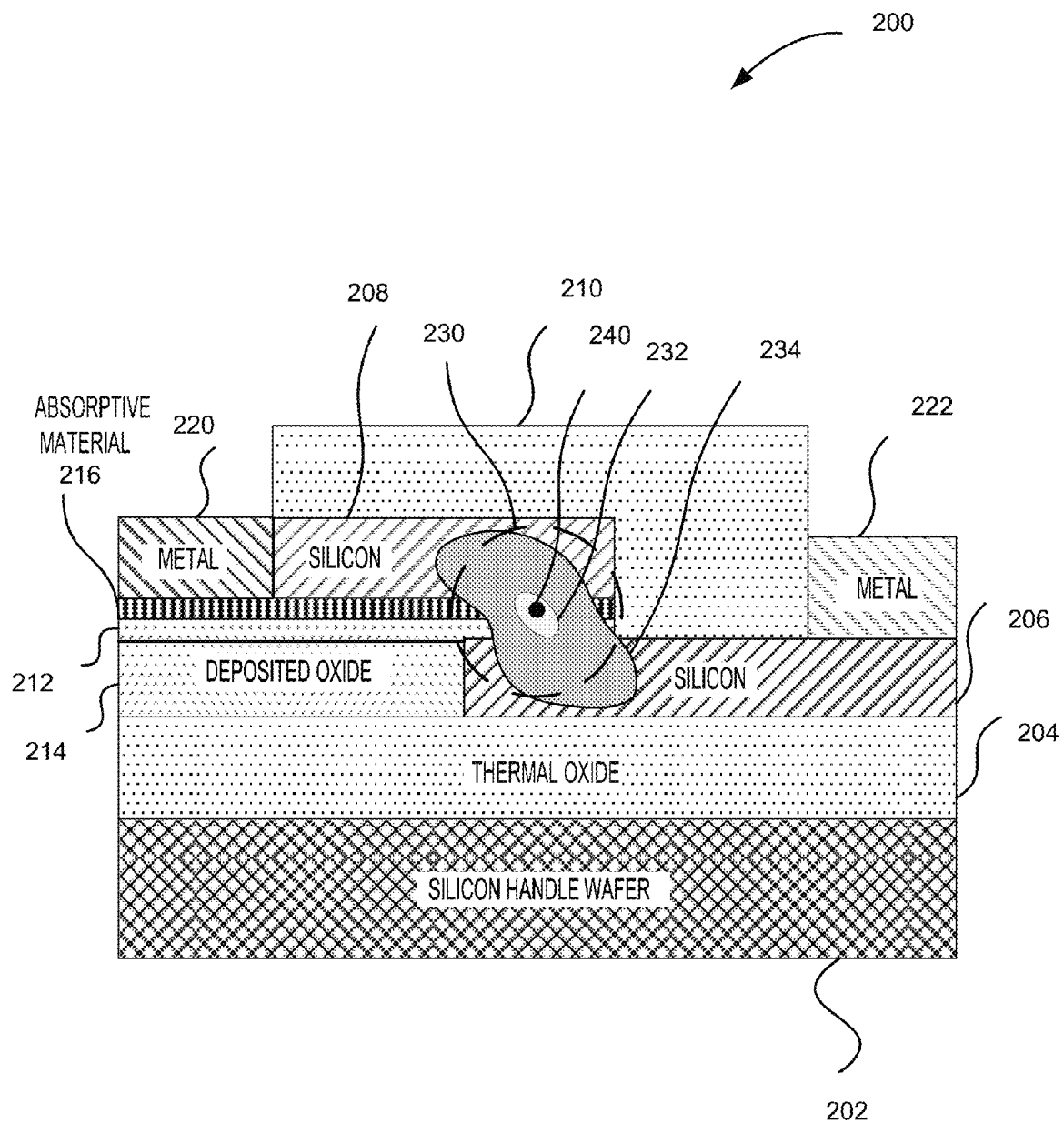
FIG. 2 is a cross-sectional side view of an example optical device that may be used as an optical modulator, in accordance with some embodiments.

FIG. 2 is a cross-sectional side view of an example optical device 200 that may be used in an optical modulator similar to the optical modulator 106, in accordance with some embodiments. As illustrated, the device 200 may include a substrate, such as a silicon handle wafer 202, and a thermally grown oxide layer or thermal oxide layer 204, e.g., the buried silicon dioxide (or buried oxide (BOX)), in a Silicon-on-Insulator or SOI wafer disposed on top of the wafer 202. The device 200 may further include a first semiconductor (e.g., silicon) layer 206 disposed on the thermal oxide layer 204 and a second semiconductor (e.g., silicon) layer 208 disposed above the first semiconductor layer 206. In some embodiments, the silicon handle wafer 202, the thermal oxide layer 204, and the first semiconductor layer 206 may comprise an SOI wafer.

The device 200 may further include a dielectric layer 212 (e.g., thin, sub-wavelength scale, high integrity layer) disposed at least partially on top of the first silicon layer 206. In some embodiments, the dielectric layer 212 may comprise silicon dioxide ($SiO_2$), silicon nitride ($Si_3N_4$), aluminum trioxide ($Al_2O_3$), hafnium dioxide ($HfO_2$), or other suitable materials. The material used for the dielectric layer 212 may have a dielectric constant less than both the absorptive material and the silicon, and may have high integrity so as to withstand operating voltage conditions.

The device 200 may further include an absorptive material layer 216 disposed substantially between the semiconductor layers 206 and 208, on top of the dielectric layer 212. Accordingly, the absorptive material layer 216 may be sandwiched between dielectric layer 212 disposed on top of the first semiconductor layer 206, and the second semiconductor layer 208, forming a semiconductor-dielectric-semiconductor (SDS) structure. In some embodiments, the total thickness of dielectric layer 212 and absorptive material layer 216 may be less than the wavelength of light for which the device 200 may be designed. The device 200 may further include a dielectric passivation layer 210 (e.g., silicon oxide) disposed substantially above the first and second semiconductor layers 206 and 208 as shown, to protect the semiconductors from oxidation and other damage. The device 200 may include other layers, such as deposited oxide layer 214, to provide for mechanical integrity of the device 200. Further, in alternate embodiments, absorptive material layer 216 may be disposed between dielectric layer 212 and the first semiconductor layer 206 instead.

As shown, at least portions of the first and second semiconductor layers 206 and 208, the dielectric layer 212, and the absorptive material layer 216 may form a waveguide 230 (denoted by a dashed line) with a center 240 of an optical mode of the waveguide 230 to guide the input light through the device 200. The absorptive material layer 216 may have a refractive index between that of the semiconductor layer 208 and the dielectric layer 212, wherein the refractive index of the dielectric layer 212 may be less than that of the semiconductor layer 208. Having semiconductor layers 206 and 208 with a semiconductor material refractive index that is higher than the refractive indexes of the absorptive material layer 216 and the dielectric layer 212 may result in a slot waveguide, providing for a desired (e.g., high) level of light confinement in the absorptive material. In summary, the SDS structure of the waveguide 230 formed by adding the semiconductor layer 208 above the absorptive material layer 216 may provide a desired level of confinement of light in and around the absorptive material layer 216 and hence desired level of modulation efficiency of the waveguide 230. The light 234 may be primarily confined within the absorptive layer material 216, having highest intensity (indicated by 232) around the optical mode center 240, and gradually fading away from the optical mode center 240.

The absorptive material used for the absorptive material layer 216 may have variable light absorption coefficient, allowing for modulation of intensity of a beam of light 234 (shown as beam cross-section) by changing the absorption of the absorptive material. For example, the light 234 input to the device 200 may be modulated through the change of the absorption characteristics (e.g., absorption coefficient or attenuation coefficient) of the absorptive material layer 216. The absorptive material may include, for example, an Epsilon Near Zero (ENZ) material, such as indium tin oxide (ITO), aluminum doped zinc oxide (AZO), or other suitable materials.

The absorption of the absorptive material layer 216 may be modulated in different ways. In some embodiments, the device 200 may include first and second metal layers 220 and 222 that, in combination with the dielectric layer 212 and absorptive material layer 216, may provide for capacitive function of the device 200. If voltage is applied between the metal layers 220 and 222, the absorption of the absorptive material layer 216 may change due to charge accumulation in the layer 216, causing a corresponding change in light intensity of light 234. For example, applying a voltage value corresponding to "zero" between the metal layers 220 and 222 may result in lowering absorption of the absorptive material layer 216, and consequently higher light intensity of light 234 traveling through the waveguide 230. Conversely, applying a voltage value corresponding to "one" between the metal layers 220 and 222 may result in increased absorption of the absorptive material layer 216, and consequently lower light intensity of light 234 traveling through the waveguide 230.

For example, as noted above, ITO may be used as the absorptive material for the absorptive material layer 216. In an unbiased condition, e.g., about 0 V, ITO may have a low optical loss and refractive index in between those of the semiconductor layer 208 and dielectric layer 212. In general, the absorptive material refractive index may be lower than those of the semiconductor layers 206 and 208 but not necessarily higher than that of the dielectric layer 212.

When voltage (e.g., about 1 V) is applied to the device 200 via the metal layers 220 and 222, charge accumulation in ITO may result in increased optical loss as well as lower refractive index, which may be less than the refractive index of the dielectric layer 212. This effect may lead to an increased confinement of light in a higher absorption loss region (e.g., absorptive material layer 216), thus resulting in reducing intensity of light compared to the unbiased condition, or in other words, resulting in optical modulation of light with high modulation efficiency for a material with given absorption characteristics.

In summary, the light 234 input by a light source (e.g., 104) to the waveguide 230 of the device 200 forming a modulator (e.g., 106) may be modulated according to voltage values applied between the metal layers 220 and 222, where the voltage values may correspond to data value (zeros and ones) to be transmitted by the transmitter 102.

As shown, the metal layers 220 and 222 may be disposed away from the center 240 of the optical mode of the waveguide 230. For example, the metal layers 220 and 222 may be moved away from the center 240 of the optical mode of the waveguide 230 by about 1 micrometer (μm). Moving the metal layers 220 and 222 away from the waveguide 230 may result in reduction of light absorption in the metal, leading to a reduced optical loss. The SDS structure with metal layers 220 and 222 disposed as described herein may allow for maintaining reasonably low resistance on the electrical path of the electrical data signal being provided to the optical modulator device and hence acceptable modulation speeds, while reducing optical loss in the waveguide 230 of the device 200.

Furthermore, placing at least one of the metal layers (e.g., metal layer 220) in direct contact with absorptive material layer 216 may result in lower contact resistance, e.g., not limited by the resistance of the silicon, leading to higher device bandwidth and hence higher modulation speed for a modulator that is based on the device 200.

As noted above, the absorption of the absorptive material layer 216 may be modulated in different ways. In some embodiments, adding fluid to the absorptive material layer 216, such as adding fluid to a microfluidic channel placed contiguously to the absorptive material layer 216, may result in change of the material absorption coefficient and consequently change in intensity of light traveling through the waveguide 230. Accordingly, the device 200 may comprise a sensor configured to detect a presence (or absence) of fluid, wherein the change in absorption coefficient of the absorptive material layer 216 may be caused by the fluid applied to the channel next to the absorptive material layer 216.

FIGS. 3-14 schematically illustrate cross-section side views of the example device 200 of FIG. 2 showing different stages of forming the SDS structure, in accordance with some embodiments. More specifically, FIGS. 3-14 illustrate the example IC fabrication operations adapted to form the SDS structure, in accordance with some embodiments. The numerals used in FIGS. 3-14 reference the components of the device 200 described in reference to FIG. 2.

Figure 3:
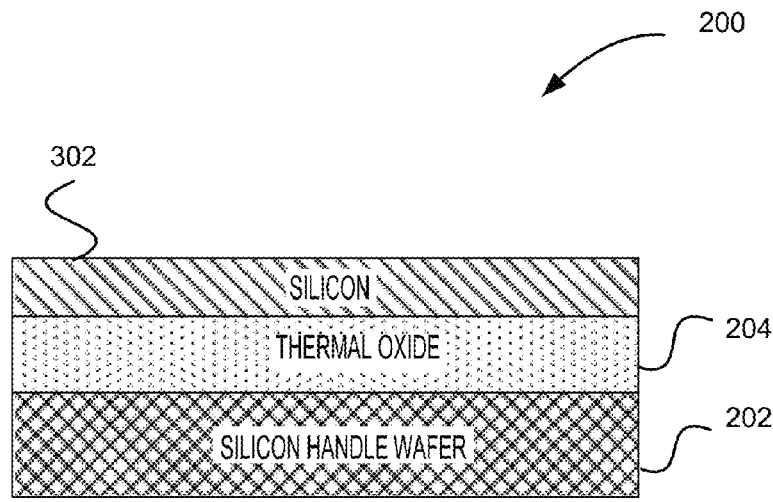
FIGS. 3-14 schematically illustrate cross-section side views of the example optical device of FIG. 2 showing different stages of forming the semiconductor-dielectric-semiconductor structure, in accordance with some embodiments.

Referring to FIG. 3, the device 200 is depicted subsequent to providing the silicon handle wafer 202 with the thermal oxide layer 204 disposed on top of the wafer 202, and depositing a semiconductor (e.g., epitaxial silicon) layer 302 on the thermal oxide layer 204. The wafer 202 may have an epitaxial silicon thickness designed for the device 200. The silicon handle wafer 202, the thermal oxide layer 204, and the semiconductor layer 302 may also comprise an SOI wafer.

Figure 4:
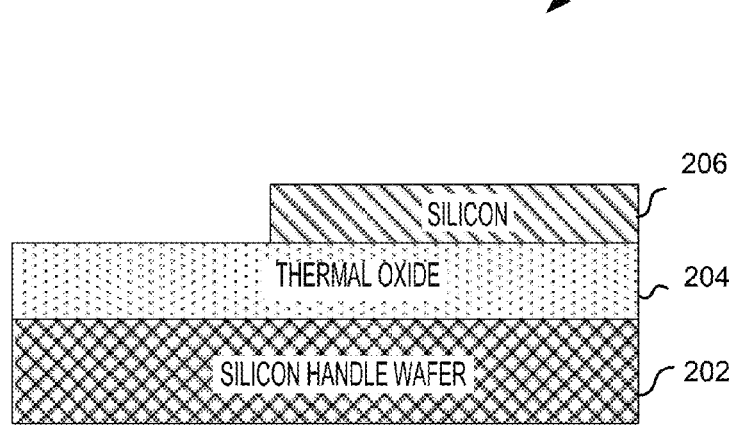

In FIG. 4, the device 200 is depicted subsequent to etching the silicon layer 302 to a portion comprising the first semiconductor layer 206 that defines a part of the waveguide 230 as described in reference to FIG. 2.

Figure 5:
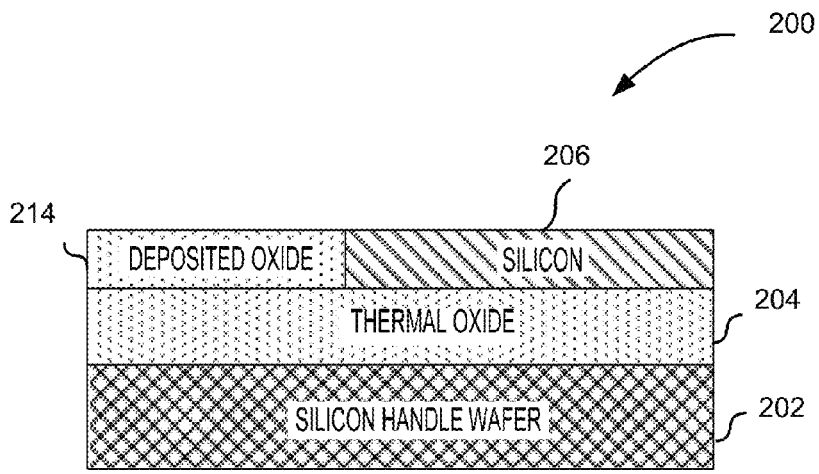

In FIG. 5, the device 200 is depicted subsequent to depositing the silicon dioxide layer 214 to cover the gap created by etching the silicon layer 302, for mechanical integrity. Since oxide deposition is a conformal process and the original oxide deposition may cover the first semiconductor layer 206, the deposited layer 214 may be polished off to expose the surface of the semiconductor layer 206.

Figure 6:
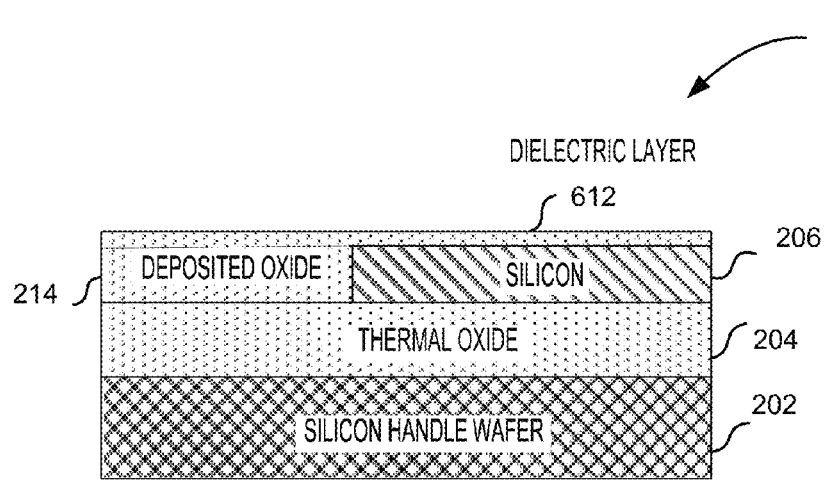

In FIG. 6, the device 200 is depicted subsequent to disposing a high integrity dielectric layer 612 on top of the layers 206 and 214. In some embodiments, the high integrity dielectric layer 612 may comprise silicon dioxide that may be thermally grown. The layer 612 might also be comprised of other materials grown by other methods, such as aluminum oxide, which may be Atomic Layer Deposited (ALD) on the layers 206 and 214. The primary requirement of the dielectric layer 612 is high integrity as well as a refractive index that is appropriate for guiding light into a slot waveguide formed by the layer 612 and the absorptive material layer 216 described in reference to FIG. 2, thus providing desired confinement of light in the absorptive material layer 216.

Figure 7:
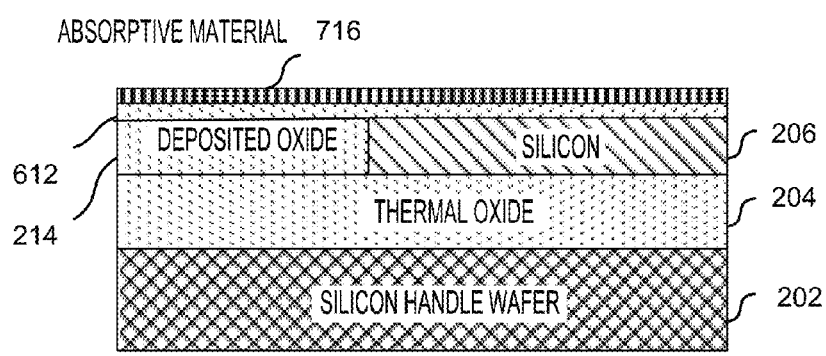

In FIG. 7, the device 200 is depicted subsequent to depositing, or otherwise disposing, the absorptive material 716 that may form the absorptive material layer 216 as described below.

Figure 8:
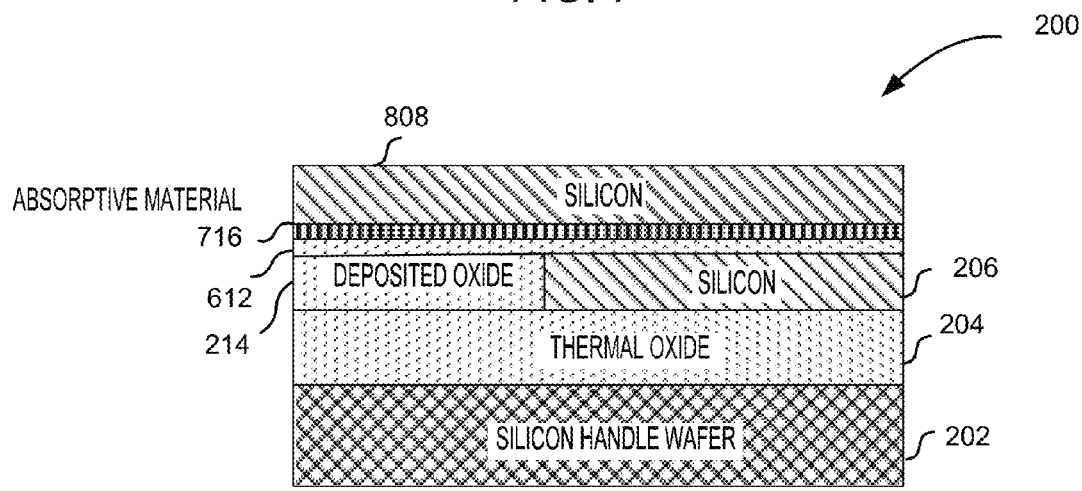

In FIG. 8, the device 200 is depicted subsequent to the growth (or deposition) of a semiconductor (e.g., silicon) layer 808 on top of the absorptive material 716. For example, amorphous silicon may be deposited and thermally annealed to crystallize into single crystal silicon (if in contact with silicon seed) or polycrystalline silicon (or polysilicon) in the absence of any seed, e.g., by Solid Phase Epitaxial Regrowth (SPER) process. Alternatively, crystalline silicon may be selectively grown using Epitaxial Lateral Overgrowth (ELO), which may also require a silicon seed in the vicinity of the optical waveguide 230 as described in reference to FIG. 2. The semiconductor layer 808 may also be formed by bonding a wafer to the thermal oxide layer 204 in FIG. 3 and then thinning the backside of the bonded wafer down to the desired thickness of silicon.

Figure 9:
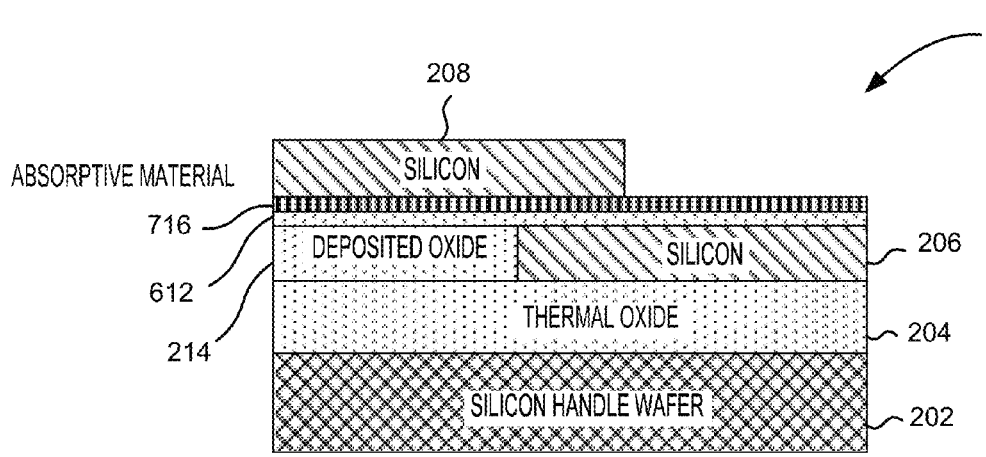

In FIG. 9, the device 200 is depicted subsequent to etching of the semiconductor layer 808 to form the second semiconductor layer 208 as described in reference to FIG. 2.

Figure 10:
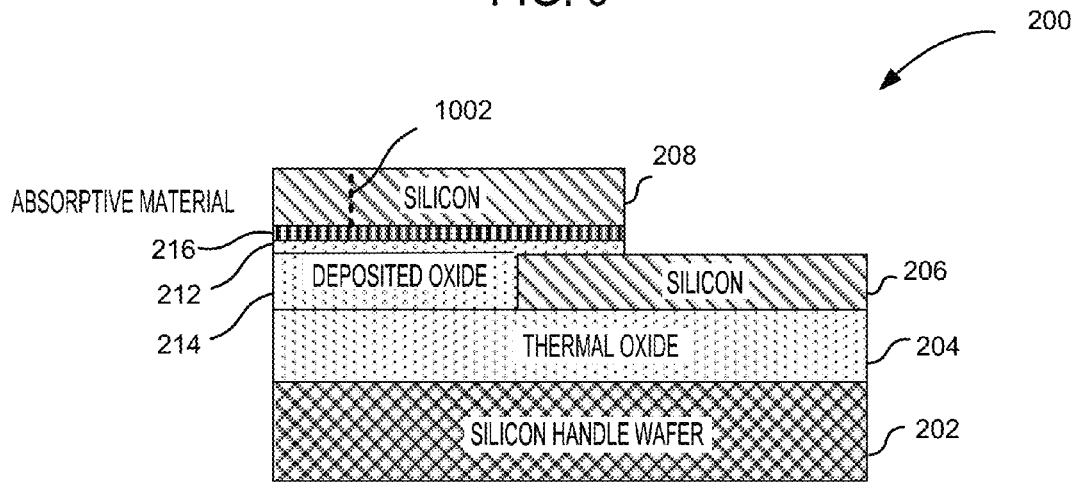

In FIG. 10, the device 200 is depicted subsequent to etching off the absorptive material 716 and dielectric layer 612 to complete the waveguide 230 definition by forming the absorptive material layer 216 and the dielectric layer 212. The second semiconductor layer 208 may be further etched (e.g., by drilling a via) through the silicon in order to provide direct metal contact to the absorptive material layer 216 underneath the second semiconductor layer 208, as shown by the dashed line 1002.

Figure 11:
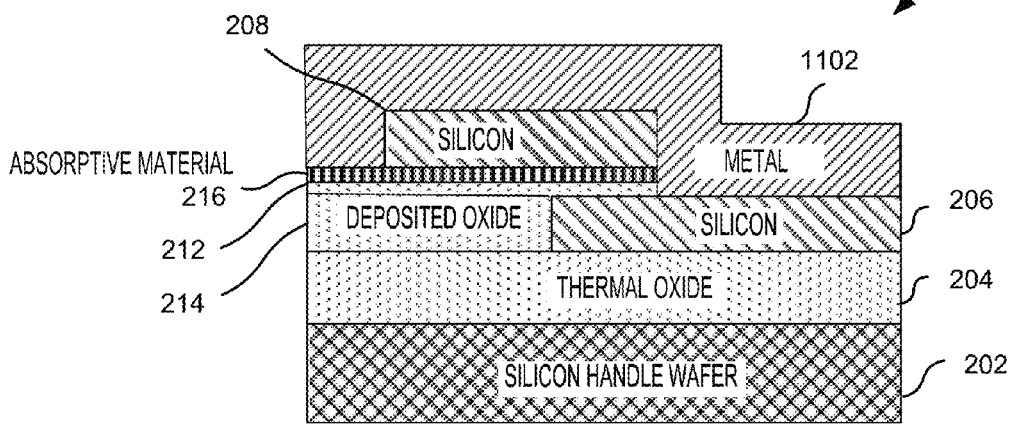

In FIG. 11, the device 200 is depicted subsequent to depositing a contact (e.g., metal) layer 1102 on top of the first and second semiconductor layers 206 and 208, as shown. The contact and/or direct metal deposition may be accomplished using processes similar to that of standard vias or through-silicon-vias.

Figure 12:
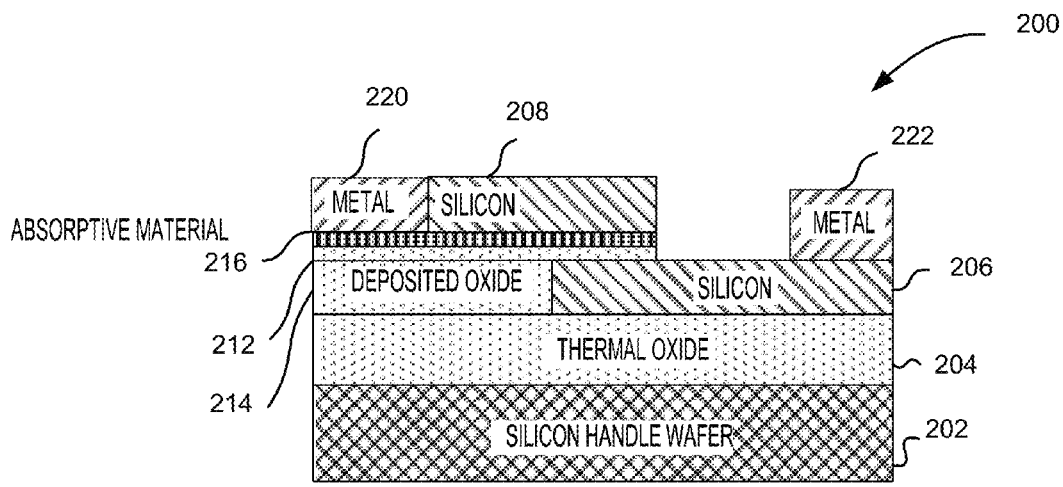

In FIG. 12, the device 200 is depicted subsequent to etching the metal layer 1102 to provide the first and second metal layers 220 and 222 as described in reference to FIG. 2.

Figure 13:
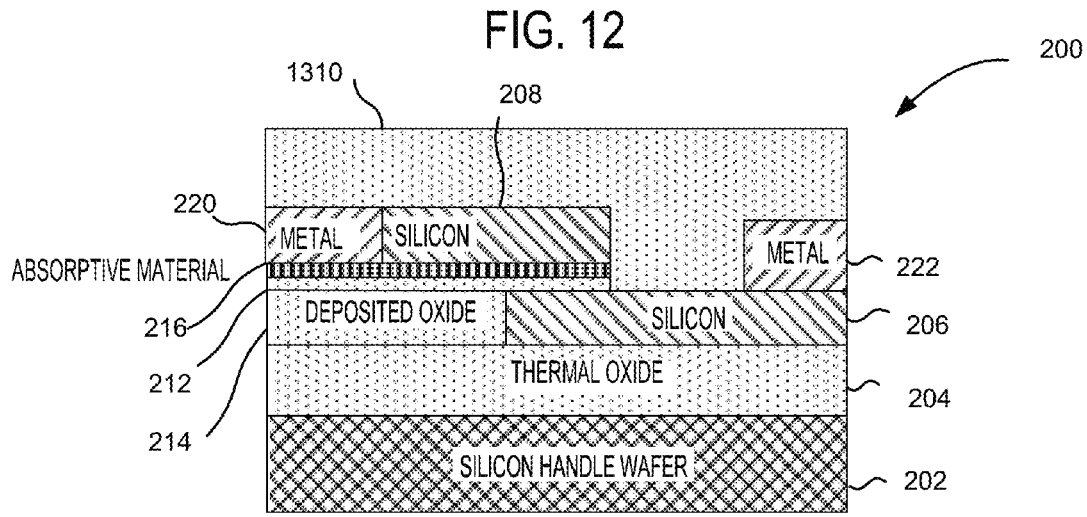

In FIG. 13, the device 200 is depicted subsequent to covering the entire layer stack-up with a deposited dielectric (e.g., oxide) layer 1310 to provide passivation of exposed surfaces formed as shown in FIG. 12.

Figure 14:
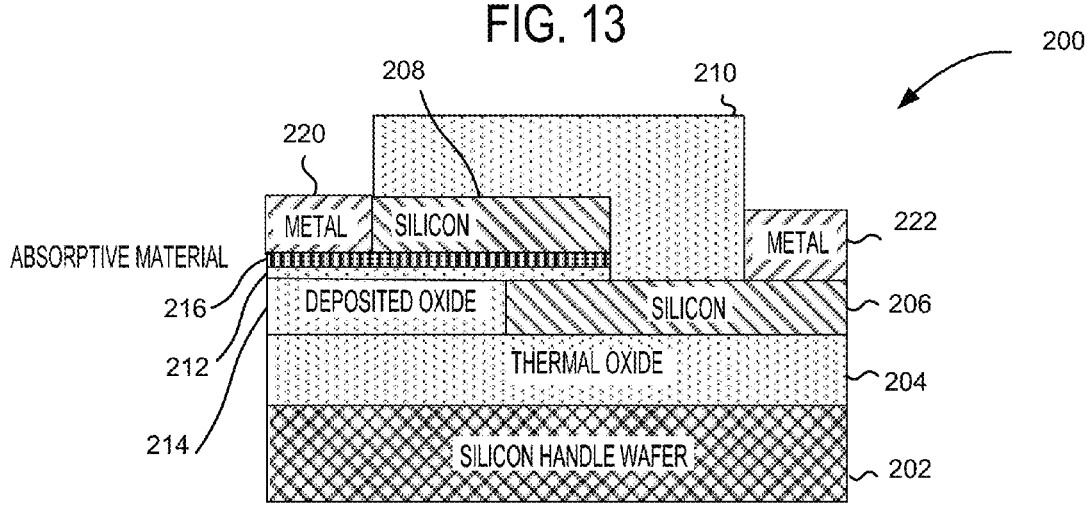

In FIG. 14, the device 200 is depicted subsequent to etching the dielectric layer 1310 to form the passivation layer 210 to expose the metal layers 220 and 222 for connection to incoming electrical signals. As shown, the resulting device of FIG. 14 forms the device 200 illustrated in FIG. 2.

Figure 15:
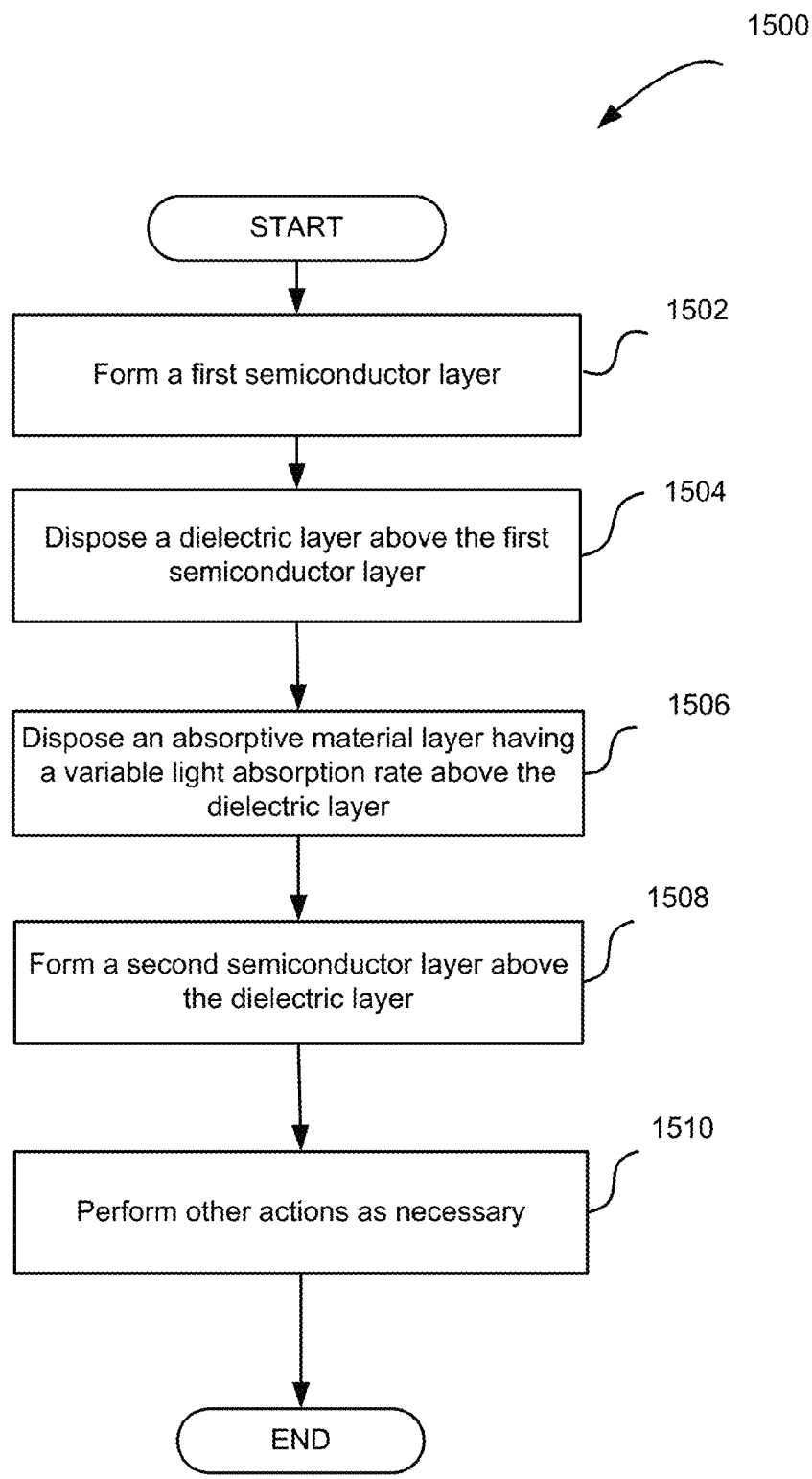
FIG. 15 schematically illustrates a flow diagram for a process of fabricating an optical device, in accordance with some embodiments.

FIG. 15 schematically illustrates a flow diagram for a process 1500 of fabricating an optical absorption based device using a semiconductor-dielectric-semiconductor structure (e.g., the device 200 of FIG. 2), in accordance with some embodiments. The process 1500 may comport with actions described in connection with FIGS. 3-14 in some embodiments.

At 1502, the process 1500 may include forming a first semiconductor layer on a substrate provided for fabricating the device 200. Prior to 1502, a semiconductor substrate may be provided, and a thermal oxide layer may be deposited on top of the semiconductor substrate, so that an optical waveguide comprising the device 200 may be substantially disposed on top of the thermal oxide layer. Additional actions (e.g., silicon doping, etching, and polishing) may be undertaken in relation to the first semiconductor layer, as described in reference to FIGS. 3-5.

At 1504, the process 1500 may further include disposing a dielectric layer above the first semiconductor layer, similar to the actions described in reference to FIG. 6.

At 1506, the process 1500 may further include disposing an absorptive material layer having a variable light absorption coefficient above the dielectric layer, similar to the actions described in reference to FIG. 7.

At 1508, the process 1500 may further include forming a second semiconductor layer above the dielectric layer, as described in reference to FIGS. 8-10.

At 1510, the process 1500 may further include optionally, alternatively, or additionally to the actions performed at 1502-1508, performing other actions as necessary. For example, the actions may include implanting the first and second semiconductor layers to reduce resistance of the semiconductor layers, disposing first and second metal layers adjacent to the first and second semiconductor layers and away from a center of an optical mode of the waveguide, depositing a passivation layer on top of the first and second semiconductor layers, and/or other actions described in reference to FIGS. 11-14.

The first and second semiconductor layers, a dielectric material disposed between the first and second semiconductor layers, and an absorptive material layer disposed between the dielectric layer and the second semiconductor layer, may form the optical waveguide of the device 200 to transmit light inputted by a light source and substantially confined between the first and second semiconductor layers. Modulating the light absorption coefficient of the absorptive material layer may allow for modulation of intensity of the transmitted light by the device 200.

Figure 16:
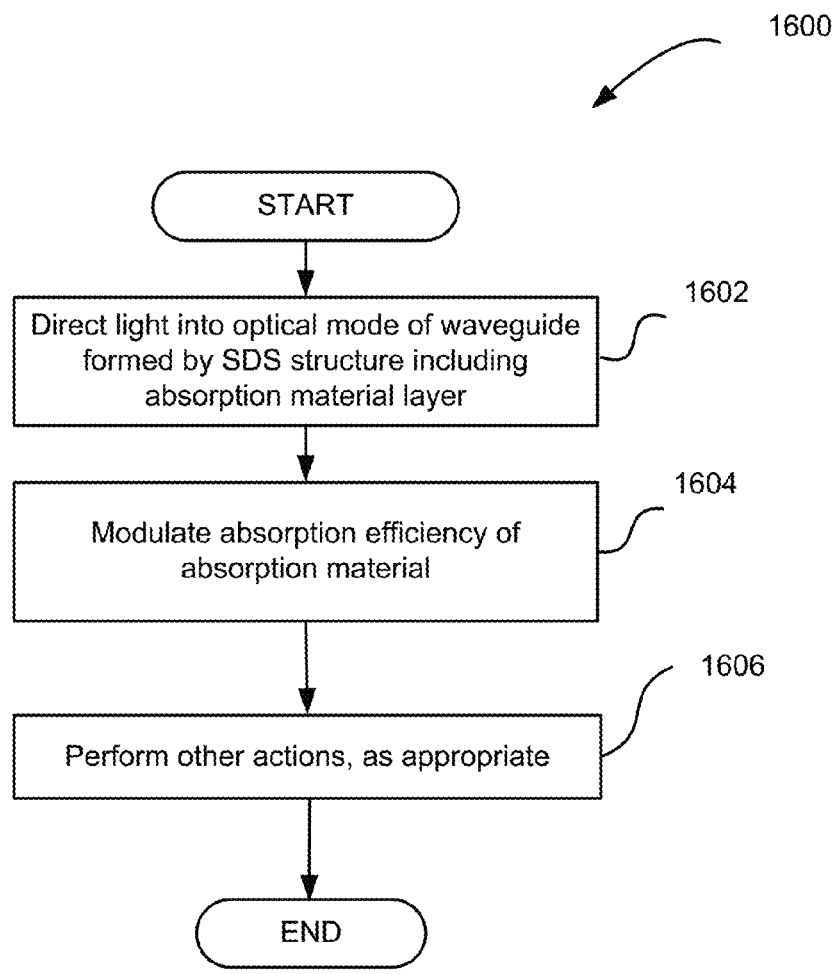
FIG. 16 schematically illustrates a flow diagram for a process of operating an optical device, in accordance with some embodiments.

FIG. 16 schematically illustrates a flow diagram for a process 1600 of operating an optical absorption based device using semiconductor-dielectric-semiconductor structure (e.g., the device 200 of FIG. 2), in accordance with some embodiments.

At 1602, the process 1600 may include coupling light from a light source into an optical waveguide that is formed by a first semiconductor layer, a second semiconductor layer, a dielectric layer, and an absorptive material layer disposed between the dielectric layer and one of the first or second semiconductor layers, e.g., an SDS structure comprising the optical waveguide.

At 1604, the process 1600 may further include modulating the intensity of the light by modulating the absorption coefficient of the absorptive material layer.

At 1606, the process 1600 may further include performing other actions, as appropriate. For example, the actions may include applying electrical signals (voltage) across the optical waveguide via first and second metal layers disposed adjacent to the first and second semiconductor layers, away from the optical mode of the optical waveguide. The actions may further include providing the modulated light for transmission via an optical communication channel optically coupled with the optical waveguide.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Figure 17:
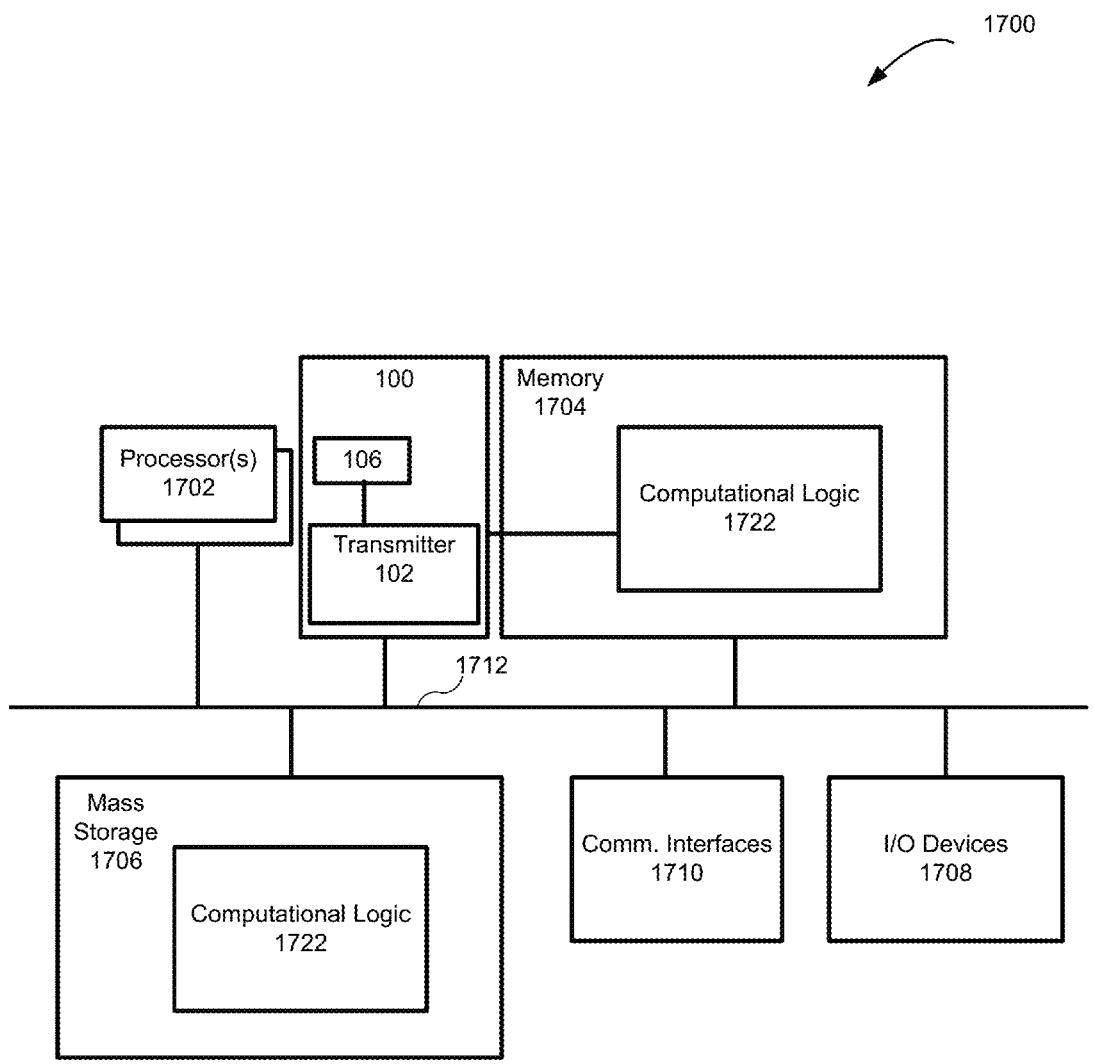
FIG. 17 schematically illustrates an example computing device including an optical device, in accordance with some embodiments.

FIG. 17 illustrates an example computing device 1700 suitable for use with various components of FIG. 1, such as optoelectronic system 100 including transmitter 102 having modulator 106 of FIG. 1, in accordance with various embodiments. As shown, computing device 1700 may include one or more processors or processor cores 1702 and system memory 1704. For the purpose of this application, including the claims, the terms "processor" and "processor cores" may be considered synonymous, unless the context clearly requires otherwise. The processor 1702 may include any type of processors, such as a central processing unit (CPU), a microprocessor, and the like. The processor 1702 may be implemented as an integrated circuit having multi-cores, e.g., a multi-core microprocessor. The computing device 1700 may include mass storage devices 1706 (such as diskette, hard drive, volatile memory (e.g., dynamic random-access memory (DRAM), compact disc read-only memory (CD-ROM), digital versatile disk (DVD), and so forth). In general, system memory 1704 and/or mass storage devices 1706 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 1700 may further include input/output devices 1708 (such as a display (e.g., a touchscreen display), keyboard, cursor control, remote control, gaming controller, image capture device, and so forth) and communication interfaces 1710 (such as network interface cards, modems, infrared receivers, radio receivers (e.g., Bluetooth), and so forth).

The communication interfaces 1710 may include communication chips (not shown) that may be configured to operate the device 1700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1710 may operate in accordance with other wireless protocols in other embodiments.

The above-described computing device 1700 elements may be coupled to each other via system bus 1712, which may represent one or more buses. In the case of multiple buses, they may be bridged by one or more bus bridges (not shown). Each of these elements may perform its conventional functions known in the art. In particular, system memory 1704 and mass storage devices 1706 may be employed to store a working copy and a permanent copy of the programming instructions for the operation of the transmitter 102 of FIG. 1. The various elements may be implemented by assembler instructions supported by processor(s) 1702 or high-level languages that may be compiled into such instructions.

The permanent copy of the programming instructions may be placed into mass storage devices 1706 in the factory, or in the field, through, for example, a distribution medium (not shown), such as a compact disc (CD), or through communication interface 1710 (from a distribution server (not shown)). That is, one or more distribution media having an implementation of the agent program may be employed to distribute the agent and to program various computing devices.

The number, capability, and/or capacity of the elements 1708, 1710, 1712 may vary, depending on whether computing device 1700 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1704 may include computational logic 1722 configured to practice aspects of embodiments, such as modulation of the absorption efficiency of the absorptive material layer of the optical waveguide of a modulator in transmitter 102, as described in reference to FIGS. 1-2 and 16. For one embodiment, at least one of processors 1702 may be packaged together with computational logic 1722 configured to practice aspects of optical signal modulation described herein to form a System in Package (SiP) or a System on Chip (SoC).

The computing device 1700 may include or otherwise associate with an optoelectronic device, such as device 200 implementing aspects of the transmitter 102, including the modulator 106 as described above. In some embodiments, at least some components of the optoelectronic system 100 (e.g., transmitter 102) may be communicatively coupled with the computing device 1700.

In various implementations, the computing device 1700 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1700 may be any other electronic device that processes data.

According to various embodiments, the present disclosure describes a number of examples. Example 1 is an optical apparatus for light modulation, comprising: an optical waveguide to transmit light input from a light source, wherein the optical waveguide includes: a first semiconductor layer; a second semiconductor layer disposed above the first semiconductor layer; a dielectric layer disposed between the first and second semiconductor layers; and an absorptive material layer disposed between the dielectric layer and the first or second semiconductor layer, wherein the absorptive material layer has a variable light absorption coefficient to allow intensity of light to be modulated through modulation of the absorption coefficient, and wherein the light is substantially confined between the first and second semiconductor layers of the waveguide.

Example 2 may include the subject matter of Example 1, and further specifies that the absorptive material layer has a first refractive index that is lower than a second refractive index of the first semiconductor layer or third refractive index of the second semiconductor layer.

Example 3 may include the subject matter of Example 2, and further specifies that the apparatus further comprises first and second metal layers to allow voltage to be applied to the optical waveguide to modulate the absorption coefficient of the absorptive material layer.

Example 4 may include the subject matter of Example 3, and further specifies that the absorptive material is disposed between the dielectric layer and the second semiconductor layer, wherein the first and second metal layers are disposed adjacent to the first and the second semiconductor layers respectively and away from a center of an optical mode of the waveguide, wherein the center of the optical mode substantially comprises a center of a substantially circled area encircling a portion of a cross-section of the apparatus that comprises portions of the first and second semiconductor layers, the dielectric layer, and the absorptive material layer forming the waveguide.

Example 5 may include the subject matter of Example 4, and further specifies that at least one of the first or second metal layers is further disposed to be in direct contact with the absorptive material layer.

Example 6 may include the subject matter of Example 5, and further specifies that at least a portion of the dielectric layer interfaces the absorptive material layer.

Example 7 may include the subject matter of Example 1, and further specifies that the first and second semiconductor layers comprise silicon (Si), and the dielectric layer comprises a high integrity dielectric material selected from at least one of: silicon dioxide ($SiO_2$), silicon nitride ($Si_3N_4$), aluminum trioxide ($Al_2O_3$), or hafnium dioxide ($HfO_2$).

Example 8 may include the subject matter of Example 1, and further specifies that the apparatus further comprises a third semiconductor substrate and a thermal oxide layer disposed on top of the third semiconductor substrate, wherein the optical waveguide is substantially disposed on top of the thermal oxide layer.

Example 9 may include the subject matter of Example 1, and further specifies that the absorptive material comprises one of indium tin oxide (ITO) or aluminum doped zinc oxide (AZO).

Example 10 may include the subject matter of any of Examples 1 to 9, and further specifies that the light source is optically coupled with the apparatus and comprises a laser.

Example 11 may include the subject matter of Example 1, and further specifies that the apparatus further comprises a sensor to detect presence or absence of fluid provided to modulate the absorption coefficient of the absorptive material.

Example 12 is an optical communications system for light modulation including at least one optical apparatus, wherein the optical apparatus comprises an optical waveguide to transmit light input by a light source optically coupled with the apparatus, wherein the optical waveguide includes: a first semiconductor layer; a second semiconductor layer disposed above the first semiconductor layer; a dielectric layer disposed between the first and second semiconductor layers; and an absorptive material layer disposed between the dielectric layer and the first or second semiconductor layer, wherein the absorptive material layer has a variable light absorption coefficient to allow intensity of light to be modulated through modulation of the absorption coefficient, and wherein the light is substantially confined between the first and second semiconductor layers of the waveguide.

Example 13 may include the subject matter of Example 12, and further specifies that the absorptive material layer has a first refractive index that is lower than a second refractive index of the first semiconductor layer or third refractive index of the second semiconductor layer.

Example 14 may include the subject matter of any of Examples 12 to 13, and further specifies that the system further comprises an optical modulator, wherein the optical waveguide further comprises first and second metal layers to allow voltage to be applied to the optical waveguide to modulate the absorption coefficient of the absorptive material layer.

Example 15 may include the subject matter of Example 14, and further specifies that the absorptive material is disposed between the dielectric layer and the second semiconductor layer, wherein the first and second metal layers are disposed adjacent to the first and second semiconductor layers and away from a center of an optical mode of the waveguide, wherein the center of the optical mode substantially comprises a center of a substantially circled area encircling a portion of a cross-section of the apparatus that comprises portions of the first and second semiconductor layers, the dielectric layer, and the absorptive material layer forming the waveguide.

Example 16 may include the subject matter of Example 15, and further specifies that the system further comprises an optical transmitter that includes the optical modulator, wherein the light source comprises a laser.

Example 17 may include the subject matter of Example 16, and further specifies that the optical transmitter is to transmit optical signals in response to electrical signals applied to the optical waveguide via the first and second metal layers.

Example 18 may include the subject matter of Example 17, and further specifies that the optical transmitter further includes a coupling device coupled with the optical modulator, to transfer the optical signals from the optical waveguide into an optical communication channel optically coupled with the optical transmitter.

Example 19 is a method for making an optical apparatus for light modulation, comprising: forming a first semiconductor layer; disposing a dielectric layer above the first semiconductor layer; disposing an absorptive material layer having a variable light absorption coefficient above the dielectric layer; and forming a second semiconductor layer above the dielectric layer; wherein the first and second semiconductor layers, a dielectric material disposed between the first and second semiconductor layers, and the absorptive material layer disposed between the dielectric layer and the second semiconductor layer form an optical waveguide to transmit light inputted by a light source and substantially confined between the first and second semiconductor layers, wherein modulating the variable light absorption coefficient of the absorptive material layer allows modulation of intensity of the transmitted light.

Example 20 may include the subject matter of Example 19, and further specifies that the method comprises: disposing first and second metal layers adjacent to the first and second semiconductor layers and away from a center of an optical mode of the waveguide.

Example 21 may include the subject matter of Example 20, and further specifies that the method further comprises: providing a third semiconductor substrate; and depositing a thermal oxide layer on top of the third semiconductor substrate, wherein the optical waveguide is substantially disposed on top of the thermal oxide layer.

Example 22 may include the subject matter of Example 21, and further specifies that the method further comprises: depositing a passivation layer on top of the first and second semiconductor layers.

Example 23 is method of using an optical apparatus for light modulation, comprising: providing light from a light source into an optical mode of an optical waveguide of an optical apparatus, wherein the optical waveguide is formed by a first semiconductor layer, a second semiconductor layer, a dielectric layer, and an absorptive material layer disposed between the dielectric layer and one of the first or second semiconductor layers; and modulating intensity of the light by modulating a variable absorption coefficient of the absorptive material layer.

Example 24 may include the subject matter of Example 23, and further specifies that modulating comprises applying an electrical signal across the optical waveguide via first and second metal layers disposed at first and second sides of the selected one of the first and second semiconductor layers, away from a center of the optical mode of the optical waveguide.

Example 25 may include the subject matter of Example 24, and further specifies that the method further comprises: providing the modulated light for transmission via an optical communication channel optically coupled with the optical waveguide.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An optical apparatus comprising:
an optical waveguide to transmit light input from a light source, wherein the optical waveguide includes:
a first semiconductor layer;
a second semiconductor layer disposed above the first semiconductor layer;
a dielectric layer disposed between the first and second semiconductor layers; and
an absorptive material layer disposed between the dielectric layer and the first or second semiconductor layer, wherein the absorptive material layer has a variable light absorption coefficient to allow intensity of light to be modulated through modulation of the absorption coefficient, and wherein the light is substantially confined between the first and second semiconductor layers of the waveguide.

2. The optical apparatus of claim 1, wherein the absorptive material layer has a first refractive index that is lower than a second refractive index of the first semiconductor layer or third refractive index of the second semiconductor layer.

3. The optical apparatus of claim 2, further comprising first and second metal layers to allow voltage to be applied to the optical waveguide to modulate the absorption coefficient of the absorptive material layer.

4. The optical apparatus of claim 3, wherein the absorptive material is disposed between the dielectric layer and the second semiconductor layer, wherein the first and second metal layers are disposed adjacent to the first and the second semiconductor layers respectively and away from a center of an optical mode of the waveguide, wherein the center of the optical mode substantially comprises a center of a substantially circled area encircling a portion of a cross-section of the apparatus that comprises portions of the first and second semiconductor layers, the dielectric layer, and the absorptive material layer forming the waveguide.

5. The apparatus of claim 4, wherein at least one of the first or second metal layers is further disposed to be in direct contact with the absorptive material layer.

6. The apparatus of claim 5, wherein at least a portion of the dielectric layer interfaces the absorptive material layer.

7. The apparatus of claim 1, wherein the first and second semiconductor layers comprise silicon (Si), and the dielectric layer comprises a high integrity dielectric material selected from at least one of: silicon dioxide (SiO2), silicon nitride (Si3N4), aluminum trioxide (Al2O3), or hafnium dioxide (HfO2).

8. The apparatus of claim 1, further comprising a third semiconductor substrate and a thermal oxide layer disposed on top of the third semiconductor substrate, wherein the optical waveguide is substantially disposed on top of the thermal oxide layer.

9. The apparatus of claim 1, wherein the absorptive material comprises one of indium tin oxide (ITO) or aluminum doped zinc oxide (AZO).

10. The apparatus of claim 1, wherein the light source is optically coupled with the apparatus and comprises a laser.

11. The apparatus of claim 1, further comprising a sensor to detect presence or absence of fluid provided to modulate the absorption coefficient of the absorptive material.

12. An optical communications system including at least one optical apparatus, wherein the optical apparatus comprises an optical waveguide to transmit light input by a light source optically coupled with the apparatus, wherein the optical waveguide includes:
a first semiconductor layer;
a second semiconductor layer disposed above the first semiconductor layer;
a dielectric layer disposed between the first and second semiconductor layers; and
an absorptive material layer disposed between the dielectric layer and the first or second semiconductor layer, wherein the absorptive material layer has a variable light absorption coefficient to allow intensity of light to be modulated through modulation of the absorption coefficient, and wherein the light is substantially confined between the first and second semiconductor layers of the waveguide.

13. The system of claim 12, wherein the absorptive material layer has a first refractive index that is lower than a second refractive index of the first semiconductor layer or third refractive index of the second semiconductor layer.

14. The system of claim 12, further comprising an optical modulator, wherein the optical waveguide further comprises first and second metal layers to allow voltage to be applied to the optical waveguide to modulate the absorption coefficient of the absorptive material layer.

15. The system of claim 14, wherein the absorptive material is disposed between the dielectric layer and the second semiconductor layer, wherein the first and second metal layers are disposed adjacent to the first and second semiconductor layers and away from a center of an optical mode of the waveguide, wherein the center of the optical mode substantially comprises a center of a substantially circled area encircling a portion of a cross-section of the apparatus that comprises portions of the first and second semiconductor layers, the dielectric layer, and the absorptive material layer forming the waveguide.

16. The system of claim 15, further comprising an optical transmitter that includes the optical modulator, wherein the light source comprises a laser.

17. The system of claim 16, wherein the optical transmitter is to transmit optical signals in response to electrical signals applied to the optical waveguide via the first and second metal layers.

18. The system of claim 17, wherein the optical transmitter further includes a coupling device coupled with the optical modulator, to transfer the optical signals from the optical waveguide into an optical communication channel optically coupled with the optical transmitter.

19. A method, comprising:
forming a first semiconductor layer;
disposing a dielectric layer above the first semiconductor layer;
disposing an absorptive material layer having a variable light absorption coefficient above the dielectric layer; and
forming a second semiconductor layer above the dielectric layer;
wherein the first and second semiconductor layers, a dielectric material disposed between the first and second semiconductor layers, and the absorptive material layer disposed between the dielectric layer and the second semiconductor layer form an optical waveguide to transmit light inputted by a light source and substantially confined between the first and second semiconductor layers, wherein modulating the variable light absorption coefficient of the absorptive material layer allows modulation of intensity of the transmitted light.

20. The method of claim 19, further comprising:
disposing first and second metal layers adjacent to the first and second semiconductor layers and away from a center of an optical mode of the waveguide.

21. The method of claim 20, further comprising:
providing a third semiconductor substrate; and
depositing a thermal oxide layer on top of the third semiconductor substrate, wherein the optical waveguide is substantially disposed on top of the thermal oxide layer.

22. The method of claim 21, further comprising:
depositing a passivation layer on top of the first and second semiconductor layers.

23. A method, comprising:
providing light from a light source into an optical mode of an optical waveguide of an optical apparatus, wherein the optical waveguide is formed by a first semiconductor layer, a second semiconductor layer, a dielectric layer, and an absorptive material layer disposed between the dielectric layer and one of the first or second semiconductor layers; and
modulating intensity of the light by modulating a variable absorption coefficient of the absorptive material layer.

24. The method of claim 23, wherein modulating comprises applying an electrical signal across the optical waveguide via first and second metal layers disposed at first and second sides of the selected one of the first and second semiconductor layers, away from a center of the optical mode of the optical waveguide.

25. The method of claim 24, further comprising:
providing the modulated light for transmission via an optical communication channel optically coupled with the optical waveguide.

* * * * *